| United States Patent [19] | [11] Patent Number: 4,578,276 |
| Morley | [45] Date of Patent: Mar. 25, 1986 |

[54] FROZEN WHIPPED CREAM

[76] Inventor: Robert G. Morley, 948 Cabot Ct., Stone Mountain, Ga. 30083

[21] Appl. No.: 705,952

[22] Filed: Feb. 27, 1985

[51] Int. Cl.$^4$ .......................... A23C 13/12; A23G 9/04
[52] U.S. Cl. .................................... 426/565; 426/570; 426/586
[58] Field of Search ............... 426/570, 564, 565, 573, 426/576, 586

[56] References Cited

U.S. PATENT DOCUMENTS

| 4,251,560 | 2/1981 | Dell et al. | 426/570 |
| 4,427,701 | 1/1984 | Morley | 426/565 |
| 4,505,943 | 3/1985 | Dell et al. | 426/570 |

FOREIGN PATENT DOCUMENTS

| 2326870 | 6/1977 | France | 426/570 |
| 1467422 | 3/1977 | United Kingdom | 426/570 |

Primary Examiner—Jeanette Hunter
Attorney, Agent, or Firm—Dale Lischer; J. Rodgers Lunsford, III

[57] ABSTRACT

A process for making a stabilized frozen whipped cream. Heavy whipping cream is whipped into whipped cream having stiff peaks, and a mixture of sweeteners and dry stabilizers is incorporated into the whipped cream. A warm gelatin solution is then blended with the whipped cream and mixture of sweeteners and dry stabilizers to form a homogeneous mass which is then frozen. The dry stabilizers are microcrystalline cellulose and sodium carboxymethylcellulose which with the gelatin give integrity to the air cell structure so that on thawing the frozen whipped cream retains its volume and does not experience syneresis.

7 Claims, No Drawings

FROZEN WHIPPED CREAM

BACKGROUND OF THE INVENTION

This invention relates generally to edible frozen whipped toppings, and more particularly concerns a stabilized frozen whipped cream composition containing real cream and a method for making such a frozen whipped cream topping.

Real whipped cream, containing only dairy whipping cream as its source of fat, is a highly desirable topping for desserts such as ice cream sundaes, cakes, pies, and the like. Real whipped cream has a much greater consumer appeal than a vegetable fat based whipped topping such as that disclosed in U.S. Pat. No. 3,431,117. Such vegetable fat based whipped toppings are generally very light and have a slightly greasy mouth feel.

When real whipped cream, however, is frozen, it breaks down rapidly on thawing losing air and volume as a result of the loss of integrity of the air cell structure. The resulting thawed whipped cream becomes soupy with large air cells which give it an open textured spongy appearance. Also, a watery liquid serum seeps out of the thawed whipped cream. This exudation of serum is known as syneresis. Loss of volume and syneresis are problems that must be solved in order to produce a stabilized frozen dairy whipped cream, which on thawing, provides a whipped cream topping that is remeniscent of one freshly prepared.

A freeze/thaw stable whipped cream topping, based on dairy cream, is disclosed in U.S. Pat. No. 4,251,560 issued to Dell et al. The frozen whipped topping disclosed in Dell, which is asserted to be stable upon thawing, is produced by means of a specially modified starch. The modified starch is said to be critical to the stability of the disclosed frozen whipped topping. Even with the specially modified starch, disclosed in Dell, it is still necessary to use highly sophisticated equipment in the production of the frozen whipped topping disclosed in the Dell et al patent. For example, the frozen whipped topping disclosed in Dell et al requires homogenizers capable of attaining pressures of at lease 6000 psi and preferably 8000 psi in order to attain overruns greater than 200% and preferably as much as 250%. Even at that, the frozen whipped topping produced in accordance with the teachings of the Dell et al patent gives a texture and mouth feel of a very light and airy whipped topping completely uncharacteristic of freshly whipped cream.

SUMMARY OF THE INVENTION

Thus it is an object of the present invention to provide a formulation and process for preparing frozen dairy whipped cream, which is stable on thawing and provides a texture and mouth feel characteristic of a freshly whipped whipping cream.

It is a related object of the present invention to provide a formulation and process for preparing a frozen dairy whipped cream which formula includes adding stabilizing colloids in dry form and a warm soluton of a stabilizing colloid.

It is a further object of the present invention to provide a process for preparing a frozen dairy whipped cream which can be carried out without the neccesity of high pressure or other sophisticated equipment.

In order to attain the above-identified objects, the present invention provides formulae for frozen dairy whipped cream which includes heavy whipping cream, carbohydrate sweeteners, one or more stabilizing colloids in dry form, and a warm solution of another stabilizing colloid.

The process for preparing the whipped cream of the present invention includes whipping the cream in a conventional fashion at high speed to form stiff peaks, blending dry stabilizing colloids and carbohydrate sweetening agents at low speed, and adding a warm solution of another stabilizing colloid and mixing at low speed until homogeneous.

In addition, conventional flavorings may be added to the formulation by blending such flavorings with the dry stabilizing colloids.

Other objects and advantages of the invention will become apparent upon reading the following detailed description.

DETAILED DESCRIPTION OF THE INVENTION

While the invention will be described in connection with a preferred embodiment and process, it will be understood that I do not intend to limit the invention to that embodiment or process. On the contrary, I intend to cover all alternatives, modifications, and equivalents as may be included within the spirit and scope of the invention as defined by the appended claims.

The frozen whipped cream of the present invention is formulated with ingredients which provide fat, protein, water, and carbohydrate sweetening agents common in freshly whipped cream. In addition, in order to provide the necessary freeze-thaw stability, a stabilizing system consisting of a mixture of three hydrocolloids is added to the formulation. The stabilizing system is provided to insure that the thawed whipped cream of the present invention has the same taste and texture that would be present in freshly whipped cream.

When butter fat is frozen and then thawed at room temperature, a layer of liquid fat, instead of crystalized fat, is formed at the interface with the protein. The liquid fat at the protein interface destroys the protein lamellae which forms the air cell structure resulting in loss of aeration with the consequent loss of volume and seepage of serum from the disrupted protein film. The stabilizer system of the present invention is used to strengthen the air cell structure and thus to produce a whipped dairy cream that is freeze/thaw stable.

The stabilizer system of the present invention employs at least one stabilizer from each of the three recognizable groups of stabilizers, namely insoluble blocking agents, water binding stabilizing gums, and gelling agents. The amount of each of the stabilizers used in the formulation is given as a percentage weight of the frozen whipped cream in formulations in which the flavorings do not constitute a significant percentage of the weight.

The blocking agent in the present invention is added in an amount generally between 0.15% and 1.0% by weight of the frozen whipped cream, and preferably between about 0.15% and 0.50% by weight of the frozen whipped cream. Suitable blocking agents may include microcrystalline cellulose and cellulose fibers. Microcrystalline cellulose is preferred.

The water binding stabilizing gum is provided in an amount between approximately 0.1% to 0.25% by weight of the frozen whipped cream, and preferably between about 0.13% and 0.17% by weight of the frozen whipped cream. Suitable gums may include locust bean gum, guar gum, propylene glycol alginate, tara gum, sodium carboxymethyl cellulose, and other cellulose ethers such as methylcellulose, hydroxypropylcellulose, and hydroxypropylmethylcellulose. A specially processed sodium carboxymethyl cellulose (containing about 50% sodium carborymethyl cellulose) is preferred and is available from Dari-Tech Industries, Atlanta, Ga.

The gelling agent is thermoreversible and comprises by weight between 0.10% and 0.5% by weight of the frozen whipped cream, and preferably between about 0.125% and 0.25% by weight of the frozen whipped cream. A suitable gelling agent is gelatin. Gelatin of 225 Bloom strength is preferred.

The above stabilizers and combinations have been used in various soft frozen ice creams and desserts. See U.S. Pat. No. 4,427,701 for example. In soft frozen ice creams and desserts the stabilizers are used to stabilize such products against thermal shock. Heretofore, such stabilizer systems have not been used to provide a frozen whipped cream that does not lose volume or experience syneresis.

The other ingredients of the stabilized frozen whipped cream include heavy whipping cream having a fat content by weight of 36% or above which whipping cream provides butter fat and protein. The heavy whipping cream is generally between 70% and 80% by weight of the frozen whipped cream. Nutritive carbohydrate sweeteners such as sucrose, dextrose, lactose, fructose, corn syrup solids, or maltodextrins or any combination of these provide additional sweetener and may be in the range between 10% and 30% by weight of the frozen whipped cream.

Water, between 1% and 2%, may be added to the formulation to allow the gelling agent to be added as a warm solution.

In addition, flavorings, such as vanilla extract, cocoa, or other flavorings may be added to the whipped cream. The amount of flavorings added to the composition is dependent on the desired taste, and generally the amount of the flavoring added to the formulation displaces a portion of the carbohydrate sweeteners or the whipping cream as a percentage weight of the frozen whipped cream. Also, other minor ingredients, such as starches, colors, flavors, salts, and artificial sweeteners may be added to the formulation to provide flavor and coloring as desired.

EXAMPLE 1

The following example is illustrative of a formulation for a vanilla whipped cream falling within the scope of the present invention with the ingredients set forth by percentage weight:

Heavy whipping cream: 76.99%
Powdered sugar: 10.21%
Dextrose: 10.21%
Processed carboxymethyl cellulose (containing 50% carboxymethyl cellulose): 0.3333%
Microcrystalline cellulose: 0.2167%
Gelatin 225 Bloom: 0.13%
Water: 1.68%
Vanilla extract: 0.23%

EXAMPLE 2

The following example is illustrative of a formulation for a chocolate frozen whipped cream falling within the scope of the present invention with the ingredients set forth by percentage weight:

Heavy whipping cream: 77.285%
Powdered sugar: 10.24%
Dextrose: 6.875%
10/12 Dutch cocoa: 3.35%
Processed carboxymethyl cellulose (containing 50% carboxymethyl cellouse): 0.2667%
Microcrystalline cellulose: 0.1733%
Gelatin 225 Bloom: 0.127%
Water: 1.683%

Frozen whipped cream made in accordance with the formulations of Examples 1 and 2 above may be prepared by first dissolving the gelatin in water and heating it to 160° F. The rest of the dry ingredients, powdered sugar, dextrose, processed carboxymethyl cellulose, microcrystaline cellulose, and flavorings, are pre-blended together. The heavy whipping cream is whipped at a temperature between 33° F. and 40° F. at high speed in a chilled bowl with chilled beaters until stiff peaks are formed. The dry blended ingredients are then added at low speed and mixed in gently until a homogenized mass is formed. The thermoreversible gelatin solution after being cooled to 100° F. is added and mixed in well at low speed. The incorporation of the dry blended ingredients and gelatin solutin is carried out at low speed in order to avoid overwhipping of the whipped cream. The resulting whipped cream is then frozen at 0° F.

The sweetened and stabilized frozen whipped cream has an overrun of 75% to 100% as a result of the initial whipping process.

After preparing both the vanilla and chocolate frozen whipped creams of Examples 1 and 2, in accordance with the above process, the frozen whipped creams were thawed to 40° F. and refrozen to 0° F. five times before finally thawing the whipped creams to room temperature. The stabilities of the frozen whipped creams were measured then by dropping a container of each of the thawed whipped creams from a height of 20 centimeters to a hard surface and repeating six times in quick succession. The whipped creams of the above formulations were stable in that they did not lose volume during this dropping procedure nor was any serum seepage evident. The thawed whipped creams were still thick and spoonable and retained semi-stiff peaks.

I claim:

1. A process for preparing stabilized frozen whipped cream comprising the steps of:
   (a) whipping whipping cream into whipped cream having stiff peaks with an air cell structure;
   (b) incorporating a mixture of dry sweeteners, a blocking agent, and a water binding stabilizing gum into the whipped cream at low speed to avoid overwhipping of the whipped cream;
   (c) blending a warm solution at about 100° F. of thermoreversible gelling agent with the whipped cream and mixture of sweeteners, blocking agent, and water binding stabilizing gum to produce a homogeneous mass wherein the blocking agent, the water binding stabilizing gum, and the thermoreversible gelling agent strengthen the air cell structure of the frozen whipped cream so that upon thawing the air cell structure does not break down resulting in loss of aeration and seepage of serum; and
   (d) freezing the homogeneous mass at or below 0° F.

2. The process of claim 1, wherein the water binding stabilizing gum is sodium carboxymethylcellulose, the blocking agent is microcrystalline cellulose, and the thermoreversible gelling agent is gelatin.

3. A process for preparing stabilized frozen whipped cream comprising the steps of:
  (a) whipping whipping cream into whipped cream having stiff peaks;
  (b) incorporating a mixture of dry sweeteners, a blocking agent of microcrystalline cellulose, and a water binding stabilizing gum of sodium carboxymethylcellulose into the whipped cream in a manner to avoid overwhipping of the whipped cream;
  (c) blending a warm solution of thermoreversible gelling agent of gelatin with the whipped cream and mixture of sweeteners, blocking agent, and water binding stabilizing gum to produce a homogeneous mass; and
  (d) freezing the homogeneous mass, wherein the frozen whipped cream comprises essentially by weight:
    (i) 70% to 80% whipping cream;
    (ii) 10% to 30% sweeteners;
    (iii) 0.1% to 0.25% microcrystalline cellulose;
    (iv) 0.15% to 1.0% sodium carboxymethylcellulose;
    (v) 0.10% to 0.50% gelatin; and
    (vi) 1.0% to 2.0% water.

4. The process of claim 3, wherein flavorings are added to the mixture of sweeteners and stabilizers and wherein the frozen whipped cream comprises essentially by weight:
  Whipping cream: 76.99%
  Powdered sugar: 10.21%
  Dextrose: 10.21%
  Processed carboxymethyl cellulose (containing 50% carboxymethyl cellulose): 0.3333%
  Microcrystalline cellulose: 0.2167%
  Gelatin: 0.13%
  Water: 1.68%
  Vanilla extract: 0.23%.

5. The process of claim 3, wherein flavorings are added to the mixture of sweeteners and stabilizers and wherein the frozen whipped cream comprises essentially by weight:
  Whipping cream: 77.285%
  Powdered sugar: 10.24%
  Dextrose: 6.875%
  Processed carboxymethyl cellulose (containing 50% carboxymethyl cellulose): 0.2667%
  Microcrystalline cellulose: 0.1733%
  Gelatin: 0.127%
  Water: 1.683%
  Cocoa: 3.35%.

6. A stabilized frozen whipped cream prepared by the process of claim 1 or 2.

7. A stabilized frozen whipped cream prepared by the process of claim 3, 4, or 5.

* * * * *